April 2, 1929.  E. N. HILBERT  1,707,633
PROCESS OF RECOVERING LUBRICANTS
Filed Jan. 23, 1926
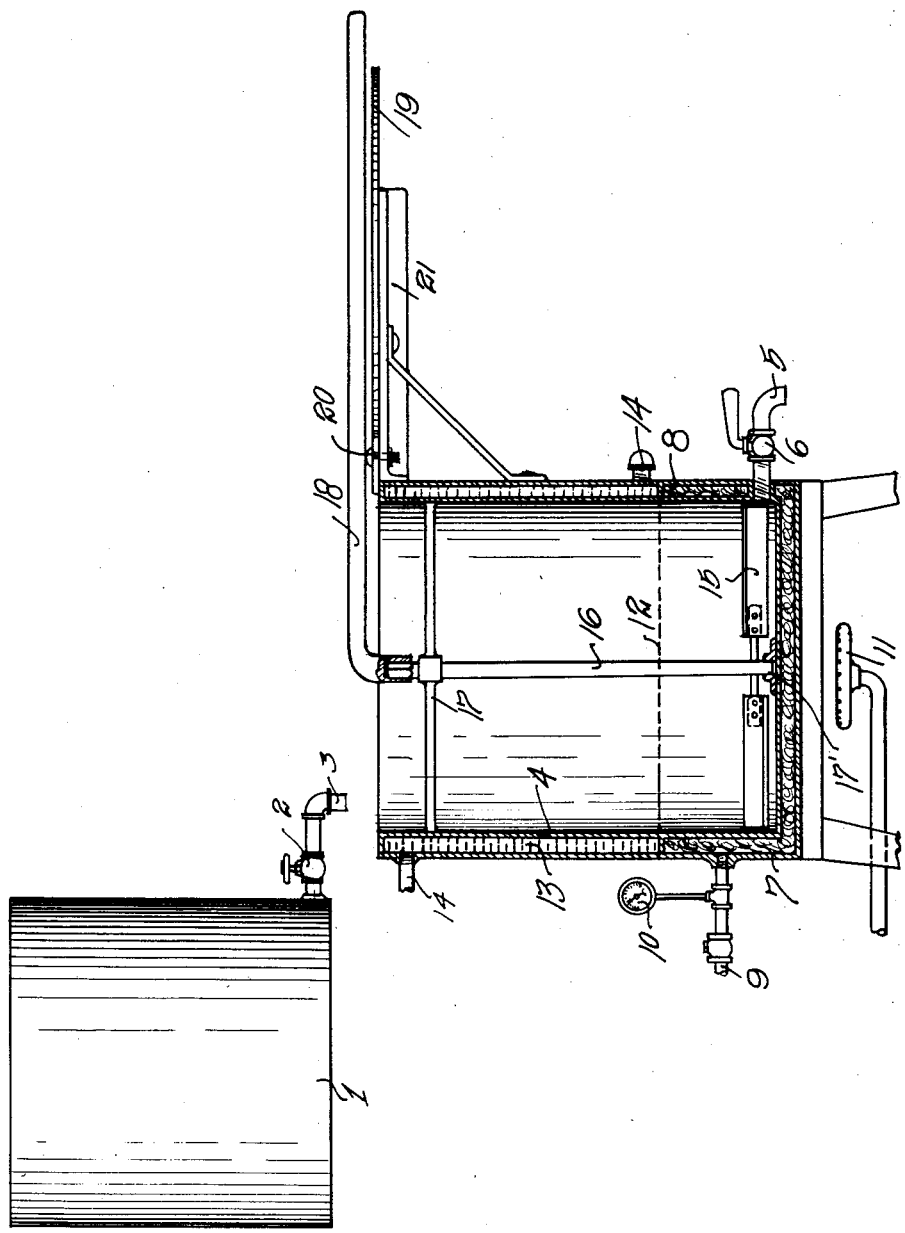
Inventor
Edgar N. Hilbert
By Herbert E. Smith
Attorney Patented Apr. 2, 1929.

1,707,633

UNITED STATES PATENT OFFICE.

EDGAR N. HILBERT, OF SPOKANE, WASHINGTON.

PROCESS OF RECOVERING LUBRICANTS.

Application filed January 23, 1926. Serial No. 83,275.

My present invention relates to improved process of making grease and lubricants from mineral oils and especially from impure oils by the addition of a filler and an exchange of heat. After the exchange of heat the sediment or settled matter that may be present is drawn off and solidified or partially solidified for use as grease or lubricant.

The figure is a view, principally in vertical section, of an apparatus for carrying out the process.

The process is especially adapted for use in the recovery of lubricating grease from crank case oils, transmission case oils, etc., of automobiles in which the gasoline, kerosene and other volatile matters have been mixed with the lubricating material. When such oils are treated they first may be filtered or screened for the removal of road dust, metal particles, &c. Although this process is not confined to the use of diluted oils but may be utilized in connection with new oil of various grades, the grease or lubricant that I recover and treat is in the form of a viscous fluid which provides a smooth and efficient lubricant for general lubricating purposes.

In treating the impure oil as crank case oil a filler in the form of a finely ground powder is added to the oil to be treated for the application of heat thereto and the quantity of this filler may be varied in accordance with the consistency of the oil to be purified.

Such a filler may be composed of the following ingredients in the approximate proportion stated:

| | Pounds. |
|---|---|
| Caustic soda | 3 |
| Milk of lime (thick) | 12 |
| Animal fat or oil | 15 |

This filler is prepared in the approximate proportion set forth by stirring together the lime solution or milk of lime and caustic soda until thoroughly dissolved. To this solution animal fat or oil is added after being properly heated and the heated fat is thoroughly mixed with the solution until a crumbling mass is formed. The mass is then allowed to cool and is ground in a suitable mill to the desired fineness or powdered form.

An example of the animal fat or oils used is stearine, which is the fat collected in the abattoir of a packing house, and this low grade of fatty oil is well adapted for use in connection with my invention. Another example is lard oil or rendered fat such as is unsuitable for human consumption.

In carrying out the process of my invention I utilize a storage tank for the oil to be treated and from which the latter is fed in suitable quantities for treatment to a heating tank. The filler is heated and stirred therein and the mass is set on fire. When the lighter oils have been burned off and the temperature has raised to at least 170° to 200° centigrade the fire is extinguished by blanketing and the mass is drawn off and allowed to cool. Impure mineral lubricating oil as petroleum, and greases, from a crank case may be stored in an elevated tank and drawn off as required by the use of the outlet valve 2 and pipe 3 and flows into the treating tank 4 which is preferably of cylindrical shape and of suitable size for the purpose.

This treating tank has at its bottom an outlet pipe 5 for the viscous sediment controlled by a valve 6 through which the recovered material may be drawn off from the tank after each heating operation. The lower part of the tank may be heated by steam introduced into a steam jacket 7 to raise the temperature of the oil to or above the flash point. This jacket forms an annular steam chamber about the lower part of the tank and the said chamber is closed at its upper end by an annular, horizontal flange 8. Steam may be introduced to the chamber through the steam pipe 9 which is provided with a gage 10 and the steam may be superheated if desired by the use of an oil or gas burner 11 located below the heating tank.

A predetermined quantity of oil is poured into the heating tank from the storage or supply tank up to the dotted line level 12 of the interior of the heating tank which line corresponds with the top of the steam jacket or partition 8 therein. After the tank has been charged with oil from the supply tank 1 a predetermined quantity of the filler as above set forth is added to the oil in preparation for the heating process. The upper part of the heating tank is fashioned with a cooling jacket 13 and circulating pipes 14 are connected thereto to supply water for cooling purposes and to prevent burning of the lining of the heating receptacle. As the oil to be treated is poured into the receptacle or tank to the level before indicated the filler is thoroughly intermingled therewith and for this purpose I utilize stirrers or agitator blades 15 located in the lower part of the tank 4 and carried by the vertical central shaft 16 supported in a spider frame 17 and on a lower bearing 17' at the center of the tank 4. A detachable handle 18 is utilized on the shaft for actuating the stirrer blades or agitators 15 to thoroughly intermingle the filler with the oil preparatory to eliminating the volatile substances by the application of heat. The material in this condition is then lighted and allowed to burn and foam. In the use of crank case oils that contain certain percentage of kerosene and gasoline the burning process can go on until these constituents are eliminated. The nature of the matter eliminated by burning can be ascertained by the character of the flame in the burner, as kerosene and gasoline will burn with a greater percentage of flame than the heavier oil ingredients.

If marketable oil is employed as the burning agent, the process may be stopped when the temperature has reached 170° to 200° centigrade. The flaming mass of oil and filler is extinguished by slipping the lid 19 which is pivoted at 20 in the frame 21 and this lid may be swung around on its pivot to the closed position to cut off the air supply and extinguish the flame. The lid may be closed or opened as the case may require but is of course opened when the handle 18 is applied for mechanically stirring the mixture as the treatment progresses.

By the application of heat through the steam jacket with or without the use of the burner 11 the contents of the tank 4 are heated to a temperature that will provide ready ignition of the oil mass; this is especially necessary in cold weather when the mass is partly solidified and difficult to agitate.

In treatment the lid is left open and the handle on the agitator is in place to keep the mass under constant movement. As the contents of the tank comes to a boiling or foaming condition the volatile elements are consumed or drawn off as gas and are thus eliminated, the extent of which may be determined by inspection.

After the fire has been extinguished the valve 6 may be opened and contents of the treating tank 4 drawn off into some suitable vessel or container. The product is in the form of a semi-fluid or viscous mass of the consistency of a thin paste somewhat similar to the well known axle grease, and this product is composed of the coagulated ingredients of the filler together with the residue from the added oil after all extraneous and volatile matters have been burned from the latter. The product possesses high lubricating qualities with a smooth texture and is particularly adapted for lubrication accomplished by the use of grease guns for greasing skidways for logs, and for use in grease cups.

Having thus fully described my invention, what I claim as new and desire to secure by Letters Patent is:—

In a process for producing a lubricating grease from crank case oil, the steps consisting in heating a quantity of the oil, adding thereto a filler in powder form produced from substantially three pounds of caustic soda, twelve pounds of milk of lime, and fifteen pounds of fat as a binder, agitating the agglomerate mass while heated, igniting the mass to burn off the more volatile oils therefrom, and withdrawing the remaining product for use as a lubricant.

In testimony whereof I affix my signature.

EDGAR N. HILBERT.